HAROLD I. DORREL
ROBERT W. HILKER
INVENTORS

BY *Lyon + Lyon*

ATTORNEYS

United States Patent Office 2,801,647
Patented Aug. 6, 1957

2,801,647

VARIABLE ORIFICE RESTRICTION VALVE

Harold I. Dorrel, West Covina, and Robert W. Hilker, Whittier, Calif., assignors to C. F. Braun & Co., Alhambra, Calif., a corporation of California Application April 5, 1954, Serial No. 421,117

4 Claims. (Cl. 138—46)

This invention relates to valves for large ducts and is particularly directed to improvements in pressure controlling valves having a pair of turning vanes which can be swung to and from a flow restricting position. Valves of this type may be used in large pipes which carry catalyst-laden flue gases in a catalytic cracking unit in a petroleum refinery.

The reason for employing restriction valves in such ducts or pipes is to reduce the pressure before the contained gases are introduced into other equipment, or into the atmosphere. As an example, the pressure may be reduced from about 15 p. s. i. to about 1 and ½ p. s. i. before discharging into the atmosphere. This is effective in reducing the noise level which would otherwise be highly objectionable. Several valve assemblies embodying our invention may be employed in series so that the pressure drop is accomplished in several stages. The valve assembly embodying our invention is intended to replace a slide valve device having a pair of sectors moved by screw jacks or other power-device and adapted to slide into the throat of the device to restrict flow. For large duct sizes such slide valve constructions become unwieldy and cumbersome and require excessive lateral space for operation and repair.

It is an important object of our invention to provide an improved form of pressure reducing valve assembly for large ducts which is relatively small and compact compared to slide valve constructions and which has advantages in operation and maintenance.

Another object is to provide an improved valve assembly of this type which employs two airfoil section vanes which operate in unison and which are mounted within a restricted throat of generally rectangular cross-section.

Another object is to provide assemblies of this type in which the vanes may be withdrawn laterally through oblong openings in the casing.

A more detailed object is to provide valve assemblies of this type embodying means for mounting each vane on its shaft in one of two positions so that each vane may be reversed on its shaft after wear on one edge has occurred.

Other and more detailed objects and advantages will appear hereinafter.

Figure 1:
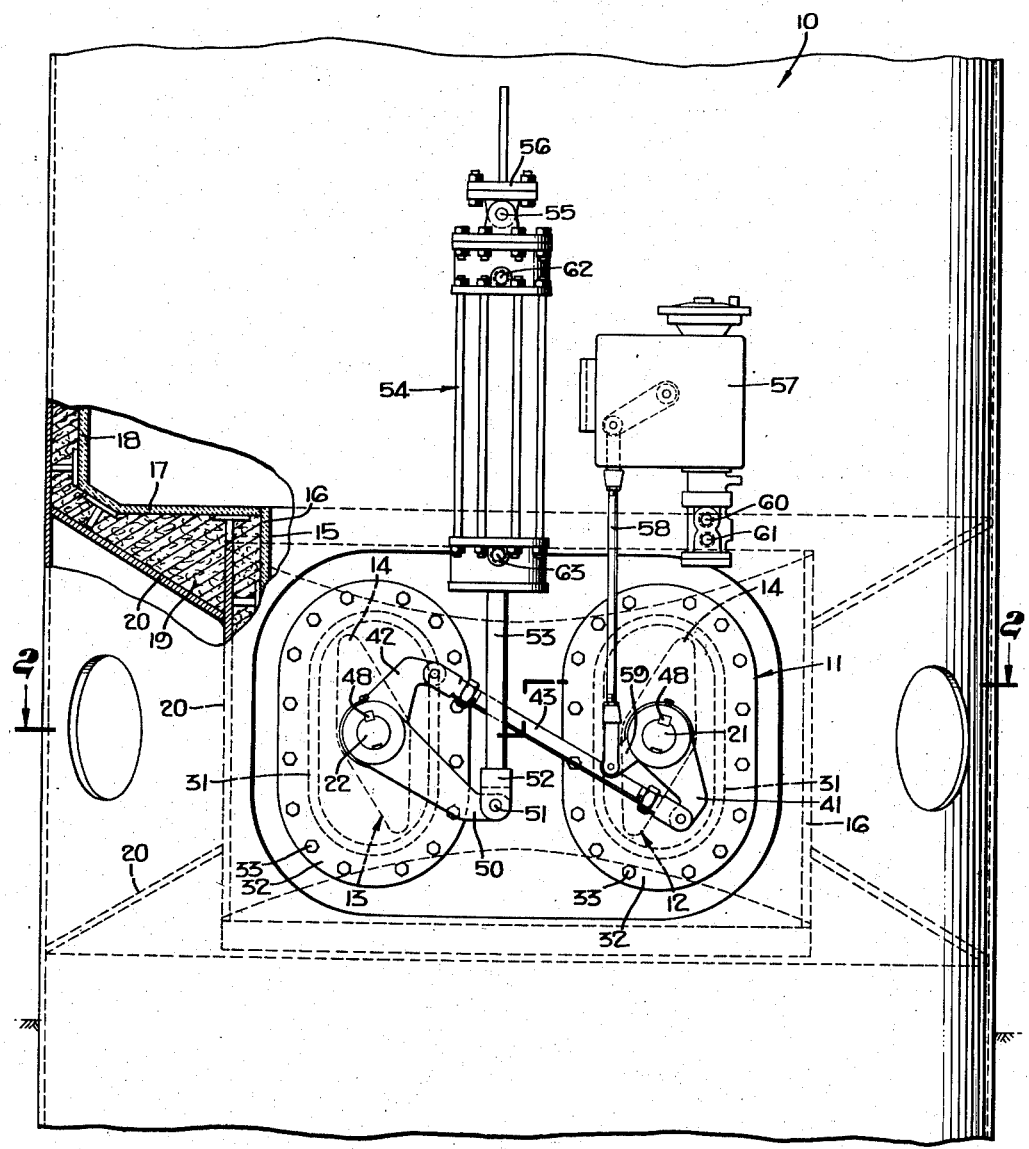
Figure 1 is a side elevation partly broken away showing a preferred embodiment of our invention.
Figure 2:
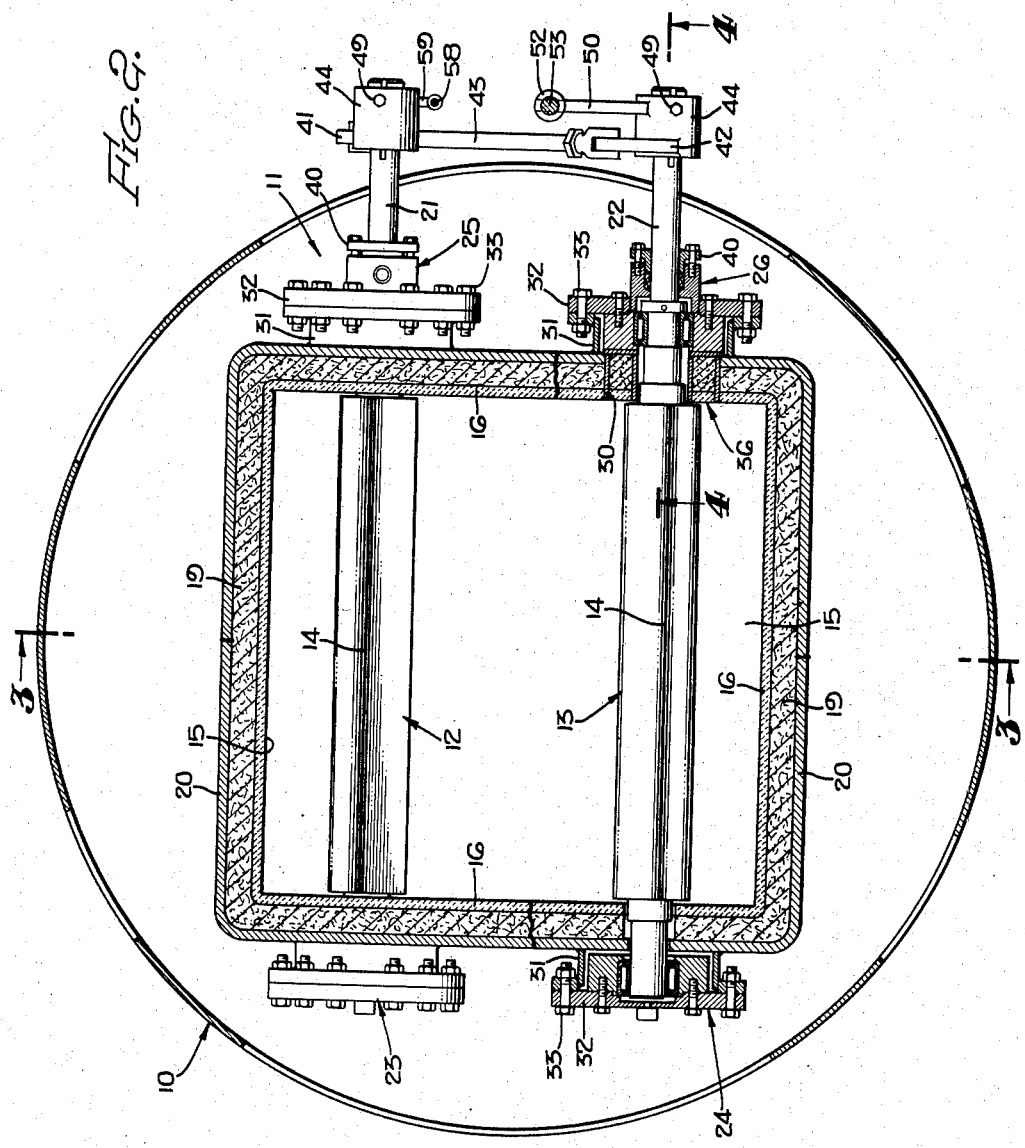
Figure 2 is a sectional plan view taken substantially on the lines 2—2 as shown in Figure 1.

Referring to the drawings:

The large duct or pipe 10 may have several valve assemblies mounted therein for operation in series. As shown in the drawings, each valve assembly generally designated 11 may be provided with a pair of duplicate flow-controlling vanes 12 and 13 and each of these vanes tapers from a relatively large central portion to relatively small oppositely directed tips or ends 14. Each vane is symmetrical about its longitudinal axis and is positioned within a restricted throat passage 15 which is substantially square in cross-section. The throat passage 15 is defined by vertical walls 16 and these walls are joined by suitable end plates 17 to the inner cylindrical shell 18 of the duct 10. Heat insulating material 19 may encompass the walls 16 and 18 and is held in position by means of the outer shell parts 20.

Each vane 12 and 13 is mounted on and fixed to one of a pair of shafts 21 and 22. The shafts project across the throat passage 15 and extend through apertures formed in the wall 16 and enclosing shell parts 20. Bearing means for rotatably supporting the shafts are mounted on the shell parts 20 exteriorly thereof. These bearing means are shown diagrammatically at 23, 24, 25, and 26. The shafts 21 and 22 may be turned to swing the vanes from the substantially full open position shown in Figure 3 to the closed position shown in phantom lines in Figure 3. In this closed position, the vanes close off a major portion of the total cross-section area of the restricted throat 15.

Each vane may include steel plates 27 which are welded to the shaft and which are welded together at the narrow edges of the vane as shown at 28. A covering or sheath 29, formed of insulating material, is supported on these plates 27. The shaft, plates, and covering sheath, turn as a unit assembly.

Figure 3:
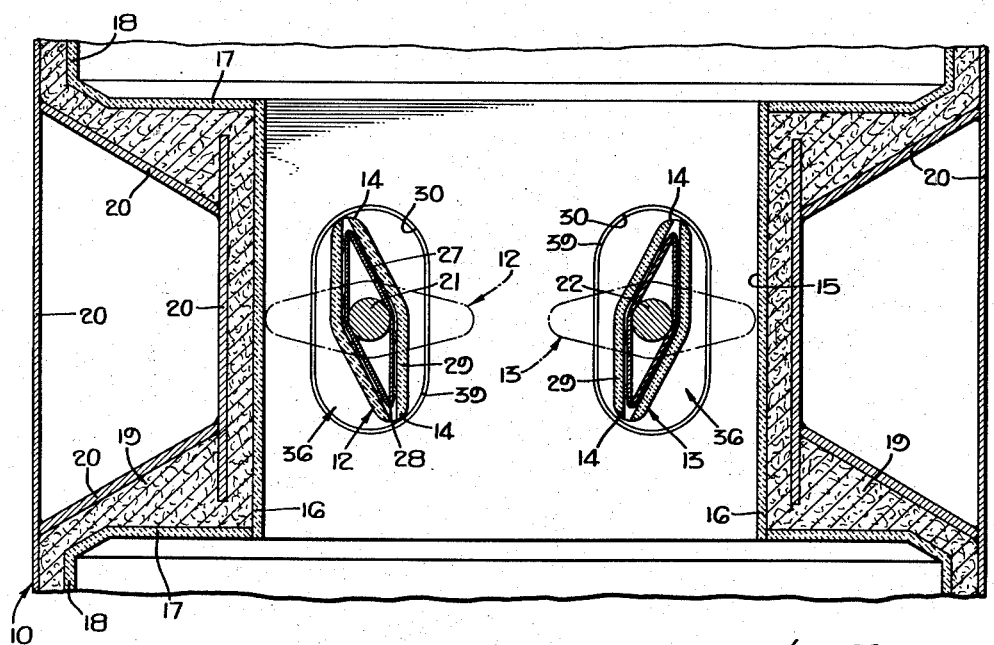
Figure 3 is a longitudinal sectional view taken substantially on the lines 3—3 as shown in Figure 2.
Figure 4:
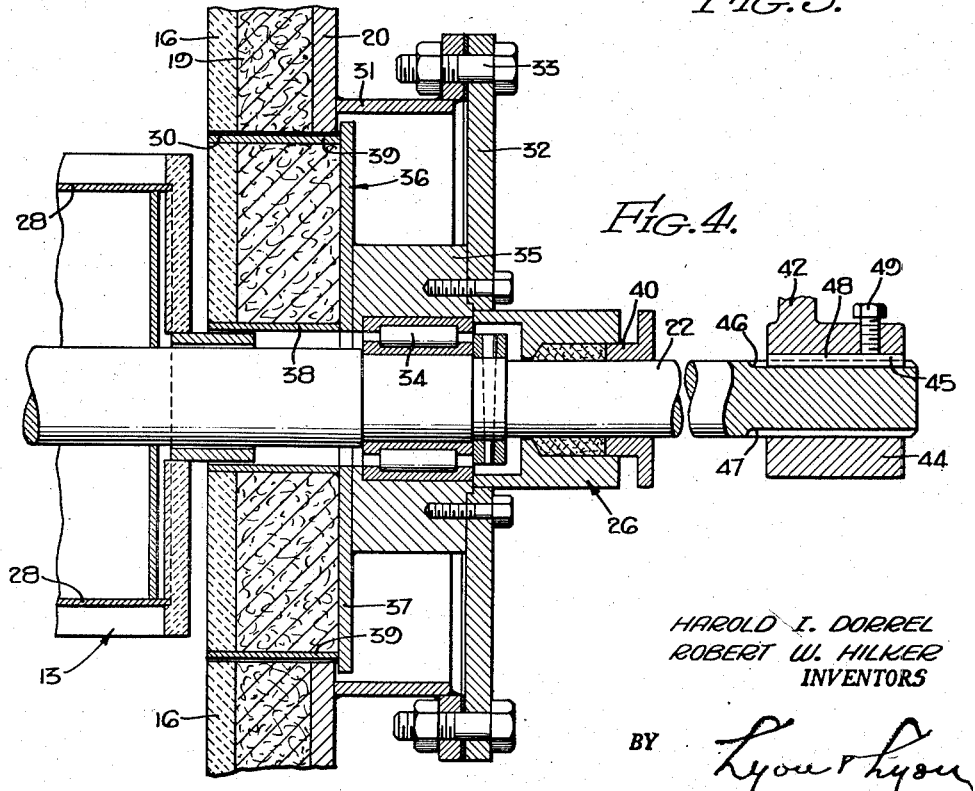
Figure 4 is a sectional detail taken substantially on the lines 4—4 as shown in Figure 2.

As shown in Figures 3 and 4, relatively large oblong apertures 30 are formed in the plate 16 and shell 20 at one end of each of the shafts 21 and 22. These apertures 30 are large enough to permit each vane to be withdrawn and replaced laterally therethrough. An oblong housing 31 is fixed to the shell parts 20 and communicates with each of the apertures 30. A closure plate 32 is attached to the housing 31 by means of fastening elements 33 and this supports the bearing assembly for each shaft. As shown in Figure 4, the bearing assembly 26 includes the bearing 34 which is mounted on the shaft 22. A sleeve 35 supports the bearing on the closure plate 32. A filler element generally designated 36 serves as a closure for the space between the shaft and the aperture 30. This element 36 includes the end plate 37, the cylindrical sleeve 38 and the oblong sleeve 39. Heat insulating material is placed in the space between sleeves 38 and 39. A stuffing box assembly 40 serves to prevent escape of gases through bearing assembly 26.

Means are provided for turning the shafts 21 and 22 and as shown in the drawings this means includes a pair of cranks 41 and 42 connected by a cross-link 43. Each of the cranks is provided with a hub portion 44 which is provided with a keyway 45. Two keyways 46 and 47 are provided on each shaft and are located at diametrically opposite positions thereon. A key 48 is received within the keyway 45 and within one of the keyways 46 or 47 to secure the hub 44 to the shaft. A set screw 49 may be provided, if desired, for locking the key against displacement. From this description, it will be understood that the shafts 21 and 22 turn in unison but in opposite directions.

A crank arm 50 fixed to the hub 44 of the crank 42 is connected by means of pin 51 to the clevis 52 carried on the extending end of the piston rod 53. This piston rod extends from the lower end of a double-acting power cylinder assembly generally designated 54. This assembly 54 is mounted on the external shell 20 by means of a pivot pin 55 and bracket 56. When the power cylinder assembly 54 is energized to project the piston rod 53, the vanes 12 and 13 are swung to the position shown in full line in Figure 3. When the piston rod 53 is retracted, the vanes are swung to the closed position, as shown in phantom lines in Figure 3. It will be understood that the vanes may be held in any intermediate position so as to produce the desired pressure drop. A regulator assembly generally designated 57, is shown in outline in Figure 1 and is connected by means of a link 58 and a crank arm 59 to the hub 44 of the crank 41. This regulator assembly 57 serves to maintain any predetermined pressure drop across the valve assembly 11. Suitable conduits, not shown, connect the regulator assembly 57 with the interior of the duct 10 above and below the location of the valve assembly 11. Suitable hydraulic means are connected to the ports 60 and 61 of the regulator assembly 57 and to the ports 62 and 63 of the power cylinder assembly 54 so that the vanes 12 and 13 are maintained in the proper position to produce the desired pressure drop. We prefer to employ the automatic regulation feature only on the last valve assembly in the series. The first two valve assemblies may be manually operated and only the last one operated automatically with a pressure regulator such as is shown at 57. When more than one valve assembly is mounted in a duct, the vanes in one assembly are mounted at right angles to the vanes in another in order to minimize channeling of the flow through the duct.

After a period of use, the upstream edges of the vanes may become worn. This is particularly true if the duct carries hot catalyst-laden flue gases. After such wear has occurred the keys 48 may be withdrawn from the keyways 46 to permit the shafts 21 and 22 to be turned through one-half revolution. The keys 48 are then reinserted in the keyways 47. In this way, the leading edges become the trailing edges of the vanes and the service life is thereby doubled. When it is desired to replace worn vanes with new ones, the fastening elements 33 are disassembled to permit the vanes and shafts to be withdrawn laterally through the oblong apertures 30. New vanes are then installed through the same apertures.

Having fully described out invention, it is to be understood that we do not wish to be limited to the details herein set forth, but our invention is of the full scope of the appended claims.

We claim:

1. In a valve assembly of the class described, the combination of: a duct having parts forming a restricted throat therein, said parts having oblong apertures extending laterally therethrough, a pair of duplicate vane assemblies extending across said throat, each vane assembly being insertable through one of said apertures, removable filler means closing said apertures, bearing means mounted exteriorly of the filler means at the ends of the vane assemblies for supporting them for turning movement about parallel axes, means positioned exteriorly of said throat inter-connecting the vane assemblies for dependent turning movement in opposite directions, and means for turning the vane assemblies from a first position restricting flow through the throat to a second position having substantially less restricting effect.

2. In a valve assembly of the class described, the combination of: a duct having parts forming a generally rectangular restricted throat therein, said parts having oblong apertures extending laterally therethrough, a pair of duplicate vanes extending across said throat, a shaft fixed to each vane and projecting from the ends thereof, each vane having opposed edges parallel to the shaft axis, each vane and its respective shaft being insertable through one of said apertures, removable filler means closing said apertures, means mounted exteriorly of the filler means for supporting the shafts for turning movement about parallel axes, means positioned exteriorly of said throat interconnecting the shafts for dependent turning movement in opposite directions, and means for turning the vanes from a first position restricting flow through the throat to a second position having substantially less restricting effect.

3. In a valve assembly of the class described, the combination of: a duct having parts forming a restricted throat therein, a pair of duplicate vanes extending across said throat, a shaft fixed to each vane and projecting from the ends thereof, each vane tapering symmetrically toward its edges in opposite directions from the shaft axis, bearing means for supporting the shafts for turning movement about parallel axes, means positioned exteriorly of said throat inter-connecting the shafts for dependent turning movement in opposite directions, means acting on the shafts for turning the vanes from a first position restricting flow through the throat to a second position having substantially less restricting effect, the latter said means including parts positioned exteriorly of the bearing means whereby the vanes and shafts may be turned one-half revolution to face either edge of the vanes upstream in said second position.

4. In a valve assembly of the class described, the combination of: a relatively large cylindrical duct having parts forming a generally rectangular restricted throat therein, said parts having oblong apertures extending laterally therethrough, a pair of duplicate vanes extending across said throat, a shaft fixed to each vane and projecting from the ends thereof, each vane and its respective shaft being insertable through one of said apertures, each vane tapering symmetrically toward its edges in opposite directions for the shaft axis, means for supporting the shafts for turning movement about parallel axes, means positioned exteriorly of said throat inter-connecting the shafts for dependent turning movement in opposite directions, means acting on the shafts for turning the vanes from a first position restricting flow through the throat to a second position having substantially less restricting effect, the latter said means including parts positioned exteriorly of the bearing means whereby the vanes and shafts may be turned one-half revolution to face either edge of the vanes upstream in said second position.

References Cited in the file of this patent
UNITED STATES PATENTS

| | | |
|---|---|---|
| 2,390,150 | Johnson et al. | Dec. 4, 1945 |
| 2,577,657 | Houk | Dec. 4, 1951 |